United States Patent [19]

Watrous

[11] 4,286,205

[45] Aug. 25, 1981

[54] INTERFACE CIRCUIT FOR STANDARD VOLTAGE REGULATORS

[75] Inventor: Donald L. Watrous, Liverpool, N.Y.

[73] Assignee: General Electric Company, Schenectady, N.Y.

[21] Appl. No.: 99,219

[22] Filed: Dec. 3, 1979

[51] Int. Cl.³ .............................................. H02J 7/16
[52] U.S. Cl. ....................................... 322/8; 322/28; 322/59; 320/64
[58] Field of Search ..................... 322/28, 7, 8, 60, 61, 322/59; 320/64, 68, 22

[56] References Cited

U.S. PATENT DOCUMENTS

| | | |
|---|---|---|
| 3,469,073 | 9/1969 | Zechin . |
| 3,525,853 | 8/1970 | Nilssen . |
| 3,611,112 | 10/1971 | Lehinoff ................................ 322/28 |

Primary Examiner—Robert J. Hickey
Attorney, Agent, or Firm—Marvin Snyder; James C. Davis

[57] ABSTRACT

An interface circuit for standard voltage regulator circuits that may be employed as an add-on component in an automotive electrical system for providing voltage regulation of the vehicle alternator in accordance with a given reference voltage that is in addition to the normal battery voltage regulation. The interface circuit includes a current control switching device coupled in the current path of the alternator field winding, and a control network responsive to the alternator output and the given reference voltage for operating said switching device in a duty cycle fashion so as to superimpose the additional regulation of the alternator voltage upon its normal battery regulation.

12 Claims, 4 Drawing Figures

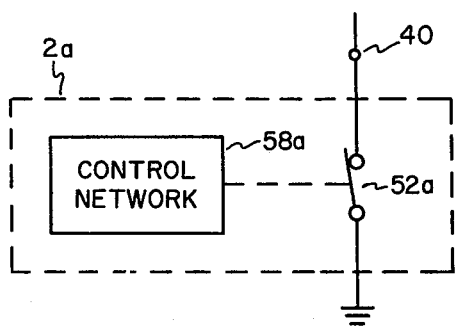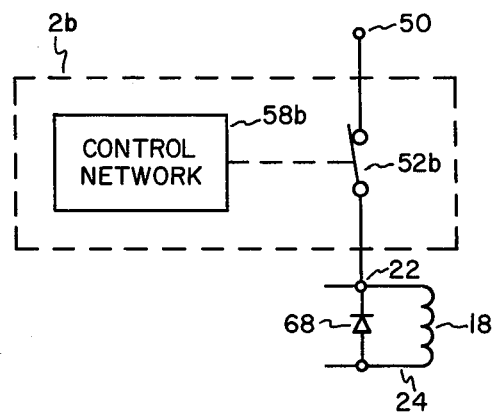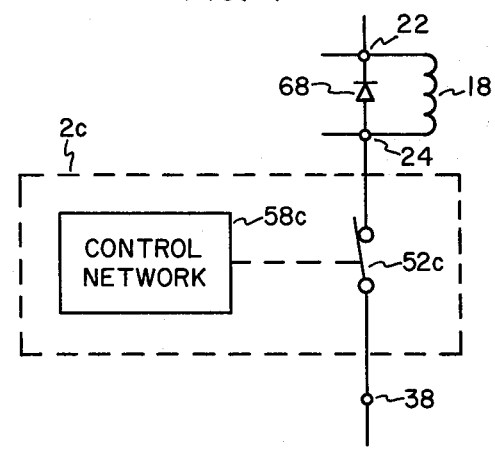

INTERFACE CIRCUIT FOR STANDARD VOLTAGE REGULATORS

BACKGROUND OF THE INVENTION

The invention relates generally to the electrical system of an automotive vehicle and, more particularly, to the voltage regulator circuits of such systems.

Present day automotive voltage regulators are essentially single purpose circuits employed to regulate the output voltage of the vehicle alternator to within a narrow band of voltages corresponding to the rated battery voltage, under varying load conditions. Simply stated, the regulator provides a modulation of the field current of the alternator as a function of existing battery voltage which is continuously sensed for maintaining the rated voltage level.

Systems have been developed which employ the vehicle alternators to supply relatively high power at above normal voltage to auxiliary loads such as power tools and resistance heating wires embedded in window material for windshield deicing. To supply such high power, the alternator output voltage is usually increased. This has been accomplished in one approach by temporarily disconnecting the standard automotive load and the regulator from the alternator, and having the battery supply the load current during this period. In more recently developed systems, there is provided a dual regulation of the alternator output voltage, whereby the alternator output is regulated in accordance with both a substantially elevated alternator voltage and the voltage across the battery. To accomplish such dual voltage regulation, redesign of the voltage regulator circuitry has been necessary. Although, the redesigned circuitry has been generally successful, the requisite circuit modifications have required new regulator components and precluded the use or adaptation of standard, off-the-shelf voltage regulators where a dual regulation is to be achieved.

SUMMARY OF THE INVENTION

It is accordingly an object of the invention to provide novel interface circuitry as an add-on component in an automotive electrical system which allows the use of standard voltage regulator and alternator components in providing a dual voltage regulation of the alternator output.

It is another object of the invention to provide novel interface circuitry for standard automotive voltage regulators which operate in conjunction with said regulators to provide dual voltage regulation of the vehicle alternator output.

It is a further object of the invention to provide a novel interface circuit as described above that is of relatively simple circuit configuration that can be inexpensively manufactured and installed.

These and other objects are accomplished with respect to an automotive electrical system including a vehicle alternator employed to energize a standard load and battery, wherein said alternator has a field winding coupled to a standard voltage regulator which together with said alternator provides a field current path through which flows field current that is modulated by the standard regulator for normally regulating the alternator output in accordance with a reference battery voltage. In accordance with the invention, there is provided a voltage regulator interface circuit which additionally regulates the alternator output voltage in accordance with a further reference voltage, comprising: a current control switching device coupled in a suitable portion of the field current path external to said alternator and said standard regulator for providing an added control of said field current, and control means responsive to a variable voltage that is a function of said alternator output and said further reference voltage for generating a control signal that operates said current control device, whereby an additional voltage regulation of said alternator output in accordance with said further reference voltage may be superimposed upon the normal voltage regulation of said alternator output.

BRIEF DESCRIPTION OF THE DRAWINGS

While the specification concludes with the claims which particularly point out and distinctly claim that subject matter which is regarded as inventive, it is believed the invention will be more clearly understood when considering the following detailed description taken in connection with the accompanying figures of the drawings, in which:

FIG. 2 is a schematic circuit diagram of the inventive interface circuit illustrating a coupling in the automotive electrical system, in accordance with a second embodiment of the invention;

FIG. 3 is a schematic circuit diagram illustrating coupling of the inventive interface circuit in accordance with a third embodiment of the invention; and FIG. 4 is a schematic circuit diagram illustrating coupling of the inventive interface circuit in accordance with a fourth embodiment of the invention.

DESCRIPTION OF THE PREFERRED EMBODIMENTS

Figure 1:
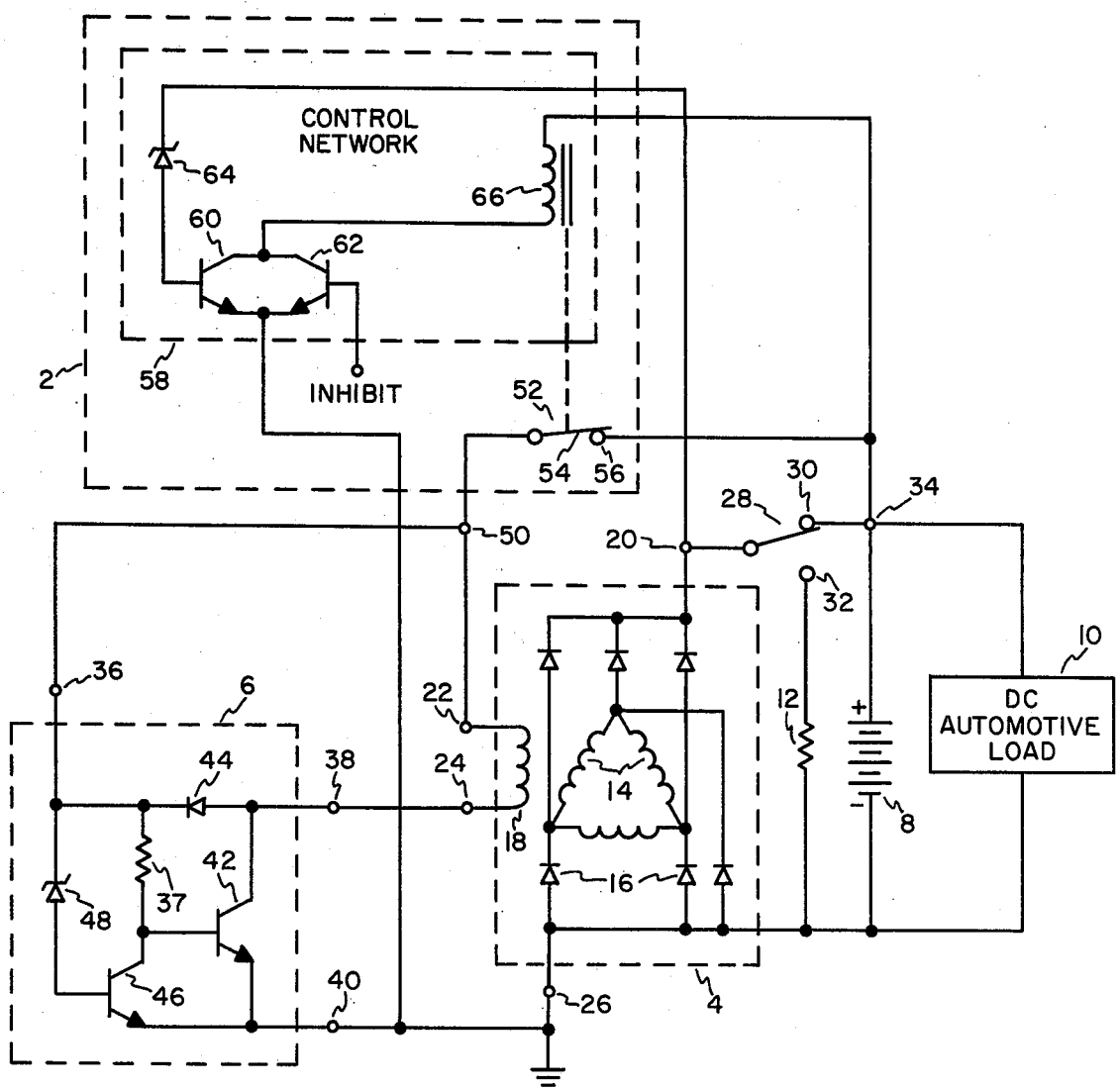
FIG. 1 is a schematic circuit diagram of a voltage regulator interface circuit as coupled in an automotive electrical system, in accordance with a first embodiment of the invention.

With reference to FIG. 1, there is illustrated a schematic circuit diagram of a voltage regulator interface circuit 2 as embodied, in accordance with a first embodiment of the present invention, in an automotive electrical system composed of otherwise conventional components. The electrical system includes a standard four terminal electric alternator 4 and a standard three terminal voltage regulator 6. Also included in the system is a vehicle battery 8 and a standard DC automotive load circuit 10, appearing in block form and representing such load components as the ignition system, lights, radio, blowers, etc. There is also illustrated as part of the electrical system a resistive heating element 12 that is intended to be supplied with power by the alternator 2 at relatively high voltages, such as for deicing purposes. For such purposes, heating element 12 is typically embedded in the vehicle windshield, and may also comprise additional resistive elements for the backlite and other vehicle windows. The voltage regulator interface circuit 2 provides an interface with the normal interconnection of the standard alternator and voltage regulator components for achieving an additional regulation of the alternator output voltage, for example, when operated at high voltage for energizing the heater element.

The alternator 4 is schematically represented in a simplified form to comprise delta configured stator windings 14 constructed integrally with a diode network including diode elements 16, a rotor field winding 18, an output terminal 20, a high voltage field winding terminal 22, a low voltage field winding terminal 24 and a ground terminal 26. In the alternator operation, current flowing in the field winding 18, which is rotatably driven by the engine shaft, generates an AC voltage in the stator windings 14 that is proportional to the field current magnitude and shaft RPM. This AC voltage is rectified by the diode network to appear as a substantially DC voltage at output voltage terminal 20.

Output terminal 20 is coupled to a switching device 28, schematically shown as a mechanical switch having a movable contact and two fixed contacts 30 and 32. When contact 30 is engaged, which is the normal switch position, the alternator output is coupled to a high voltage terminal 34 of battery 8 and DC automotive load 10 for supplying current to these components. When contact 32 is engaged, the alternator is employed to supply power to resistive heating element 12 for a limited heating period, during which time the battery supplies the current requirements of the load circuit.

Voltage regulator 6 is schematically represented in a simplified form to include a voltage sensing terminal 36, a field current terminal 38 and a ground terminal 40. A first NPN transistor 42 has its collector coupled to terminal 38 and to the anode of a forward conducting diode 44, and its emitter coupled to terminal 40 and to the emitter of a second NPN transistor 46. The collector of transistor 46 is coupled directly to the base of transistor 42 and through a bias resistor 37 to terminal 36 and to the cathodes of diode 44 and a backward biased voltage reference diode 48 which has its anode coupled to the base of transistor 46. The breakdown voltage of diode 48 provides a battery reference voltage, typically 14.4 volts. Terminal 36 is joined to terminal 22 of the alternator at a junction point 50 which, in accordance with the present embodiment of the invention, is coupled through the interface circuit 2 to battery high voltage terminal 34. Terminal 38 is coupled to terminal 24 of the alternator, and terminal 40 is coupled to circuit ground.

In general, when the voltage applied to input terminal 36 is less than the breakdown voltage of the reference diode 48, transistor 46 is non-conducting and transistor 42 conducts field current through the field winding for generating an output voltage at output terminal 20. The field current is equal to the effective average voltage across the field winding divided by the resistance of the field winding. When the voltage at input terminal 36 exceeds the reference diode breakdown voltage so as to cause transistor 46 to conduct and transistor 42 to be nonconducting, the field current goes substantially to zero and for this time essentially no output voltage is generated. The alternator diode network prevents discharge current flowing from the battery to the alternator. In actual operation, the conventional regulator system is constructed to exhibit a hystersis characteristic so that transistor 42 is controlled to conduct with a duty cycle that is a function of the difference between the voltage being sensed by the regulator and the battery reference voltage, thereby controlling the magnitude of field current. Diode 44 is a free wheeling diode provided to accomodate the transient field current when transistor 42 is temporarily in nonconducting, since the field of the alternator is highly inductive and the field current cannot be changed abruptly. In a well known manner, the inductive time constant of the field current controls the timing of the duty cycle of transistor 42 and keeps the alternator output current waveform smooth.

The voltage regulator interface circuit 2 includes a field current control device in the form of a normally closed switching device 52, which in the present embodiment is a mechanical switch having a movable contact 54 and a fixed contact 56 which couple junction point 50 to terminal 34. The switching device 52 may be appreciated to be coupled in the field current path which extends from terminal 34, through field winding 18, through transistor 42 to ground. The interface circuit further includes a control signal generating network 58 for actuating the switching device, comprising a pair of NPN transistors 60 and 62, a backward biased voltage reference diode 64 and a relay coil 66. Reference diode 64, whose anode is coupled to output terminal 20 and whose cathode is coupled to the base of transistor 60, provides a second reference voltage, which in the present embodiment contributes to regulating the elevated alternator output voltage during energization of heater element 12. Typically this reference voltage is 40 volts. The emitters of transistors 60 and 62 are joined and coupled to ground, and their collectors are joined and coupled through relay coil 66 to terminal 34. An inhibit signal may be coupled to the base of transistor 62 for providing an overriding control of the alternator.

The interface circuit 2 operates to provide a second voltage regulation of the alternator output voltage in accordance with the reference voltage of reference diode 64, which regulation is superimposed upon that provided by the standard voltage regulator 6. It has the advantage of providing such additional regulation as an add-on component to the automotive electrical system allowing the employment of standard, i.e., off-the-shelf, voltage regulator and alternator components with no modification whatsoever required to their internal circuitry.

The switching device 52 can alternatively be in the form of a semiconductor switch, such as an FET or bipolar transistor device. The principal requirement is that the device exhibit an extremely low impedance and a negligible voltage drop when in its closed or conducting state. When employing a semiconductor switch, the control network may be readily modified in the case of the FET for providing a suitable control voltage to actuate this device, and in the case of a bipolar transistor for providing a suitable control current to actuate this device.

In the embodiment of FIG. 1, with switch 28 connected to engage contact 30, standard voltage regulator 6 will regulate the alternator output voltage in accordance with the battery reference voltage, as previously described. During this time, application of the alternator output sensing voltage to the reference diode 64 of control network 58 fails to break the diode down and transistor 60 is nonconductive. Switch 52 remains in its closed state. When switch 28 is connected to engage contact 32 for energizing heater element 12, the interface circuit functions to regulate the alternator output voltage in accordance with the reference voltage of diode 64. At this time, the battery voltage applied to the input terminal of voltage regulator 6 will normally be less than the breakdown voltage of reference diode 48, which places transistor 42 in its conducting state. When the alternator output voltage at terminal 20 is less than the breakdown voltage of reference diode 64, transistor 60 is in its nonconducting state for keeping switch 52 closed. Field current accordingly will be conducted through switch 52, field winding 18 and transistor 42 for increasing the alternator output. When the voltage at terminal 20 exceeds the breakdown voltage of diode 64, transistor 60 is activated, causing current to be conducted through relay coil 66. This opens the switch 52 to essentially terminate the field current, transient field current being conducted through free wheeling diode 44. Upon the alternator output voltage once more falling below the reference voltage of diode 64, transistor 60 again ceases conduction and switch 52 closes. The interface circuit operates in similar manner to that previously described with respect to the standard voltage regulator, with the relay coil contributing a hysteresis characteristic for slightly different turn on and turn off current levels. Thus, the switching device 52 is operated with a duty cycle that is a function of the difference between the alternator output voltage sensed by the network 58 and its reference voltage, to thereby control the magnitude of the field current.

The inhibit operation of transistor 62 may be employed as an external control of the alternator output voltage, useful for any number of reasons when it should be desirable to reduce the field current and/or the alternator output voltage to zero.

In the system of FIG. 1 the alternator output is switchably coupled between the battery and the elevated voltage heater element, and although voltage regulation of the interface circuit 2 is superimposed upon that of the standard voltage regulator 6, the two circuits operate substantially in sequence. However, in some automotive electrical systems the alternator output may be coupled through a series connected heating element to the battery and load circuit for simultaneous energization of these components. In such case, it may be desirable to provide a dual regulation of the alternator output voltage with sensing voltages simultaneously coupled from the alternator output terminal directly, and from across the battery. In employing the present interface circuit in systems of this type, where the battery voltage is coupled to the standard voltage regulator and the elevated output voltage of the alternator is coupled to the interface circuit, the two circuits would operate substantially in concert.

The switching device of the interface circuit can be coupled in other portions of the field current path and operated to perform the same function as described with respect to that of FIG. 1. Accordingly, in FIG. 2 is illustrated a second embodiment of the invention wherein the switching device 52$^a$ of interface circuit 2$^a$ under the control of network 58$^a$, shown in block form, is coupled between terminal 40 of the standard voltage regulator and ground. In situations where the standard voltage regulator is normally mounted to the vehicle frame at its common terminal 40, a suitable mounting adjustment must be made since the common terminal is no longer accessible for a fixed ground connection. The construction, circuit connections and operation of the components in FIG. 2 are otherwise the same as that of the correspondingly numbered components in FIG. 1, and therefore need not be further described.

In FIG. 3 is a third embodiment of the invention illustrating another portion of the field current path in which the switching device can be coupled to provide the same function as described for FIG. 1. In this embodiment, the switching device 52$^b$ of interface circuit 2$^b$, under the control of network 58$^b$, is coupled between the junction 50 and high voltage field terminal 22 of the alternator 4. The circuit components are again the same as FIG. 1. However, this coupling also requires coupling of an added free wheeling diode 68 in shunt with the field winding 18 for accommodating transient field currents, since there is no longer available a closed current path including free wheeling diode 44 of the regulator.

FIG. 4 illustrates a fourth embodiment of the invention wherein switching device 52$^c$ of interface circuit 2$^c$, under the control of network 58$^c$, is coupled between low voltage field terminal 24 of the alternator and field terminal 38 of the regulator. As in FIG. 3, this embodiment also requires free wheeling diode 68 to be coupled in shunt with field winding 18. The circuit construction and operation is otherwise as in the previous embodiments.

Although the invention has been described with reference to specific embodiments thereof, it is not intended to be thusly limited. Rather, the following claims are to be construed as including within their ambit all modifications and alternatives of the disclosed circuitry that fall within the true scope of the invention.

What I claim as new and desire to secure as Letters Patent of the United States is:

1. In combination with a vehicle alternator employed to energize a standard load and battery, said alternator having a field winding coupled to a standard voltage regulator which together with said alternator provides a field current path through which flows field current that is modulated by said standard regulator for normally regulating the alternator output in accordance with a reference battery voltage, a voltage regulator interface circuit for additionally regulating said alternator output in accordance with a further reference voltage so as to provide energization for an auxiliary load, comprising:
   (a) a current control device coupled in said field current path in series with said battery and being external to said alternator and said standard regulator for providing an added control of said field current;
   (b) switching means for selectively coupling said alternator output to said battery or to said auxiliary load; and
   (c) control means responsive to a variable voltage that is a function of said alternator output for generating a control signal that operates said current control device, whereby an additional voltage regulation of said alternator output in accordance with said further reference voltage may be superimposed upon the normal voltage regulation of said alternator output during energization of said auxiliary load.

2. A voltage regulator interface circuit as in claim 1 wherein said current control device is a switching device that further modulates said field current as a function of said control signal.

3. A voltage regulator interface circuit as in claim 2 wherein said field current path includes a common terminal of said standard regulator and said current control device is coupled between said common terminal and a common point of the circuit.

4. A voltage regulator interface circuit as in claim 3 wherein said current control device comprises a pair of normally closed mechanical contacts and said control means generates a control current in response to said control signal for actuating said contacts between their open and closed positions.

5. A voltage regulator interface circuit as in claim 4 wherein said control means includes a semiconductor device and comparison means for comparing said variable voltage and said further reference voltage, said semiconductor device being responsive to the output of said comparison means to generate said control signal.

6. A voltage regulator interface circuit as in claim 2 wherein said field current path includes a high voltage field terminal of said alternator coupled at a junction to an input terminal of said standard regulator, and said current control device is coupled in that part of said field current path between said junction and said battery.

7. A voltage regulator interface circuit as in claim 6 wherein said current control device comprises a pair of normally closed mechanical contacts and said control means generates a control current in response to said control signal for actuating said contacts between their open and closed positions.

8. A voltage regulator interface circuit as in claim 7 wherein said control means includes a semiconductor device and comparison means for comparing said variable voltage and said further reference voltage, said semiconductor device being responsive to the output of said comparison means to generate said control signal.

9. A voltage regulator interface circuit as in claim 2 wherein said field current path includes a high voltage terminal of said alternator coupled to the junction of said battery and an input terminal of said standard regulator, and said current control device is coupled in that part of said field current path between said junction and said high voltage terminal, and which further includes a free wheeling diode device coupled in parallel with said field winding for conducting transient field currents during the operation of said current control device.

10. A voltage regulator interface circuit as in claim 9 wherein said control means includes a semiconductor device and comparison means for comparing said variable voltage and said further reference voltage, said semiconductor device being responsive to the output of said comparison means to generate said control signal.

11. A voltage regulator interface circuit as in claim 2 wherein said field current path includes a low voltage terminal of said alternator and said current control device is coupled between said low voltage terminal and an input terminal of said standard regulator, and which further includes a free wheeling diode device coupled in parallel with said field winding for conducting transient field currents during the operation of said current control device.

12. A voltage regulator interface circuit as in claim 11 wherein said control means includes a semiconductor device and comparison means for comparing said variable voltage and said further reference voltage, said semiconductor device being responsive to the output of said comparison means to generate said control signal.

* * * * *